United States Patent [19]

Sweet

[11] 4,136,295
[45] Jan. 23, 1979

[54] AIRCRAFT BRUSH MODULE

[75] Inventor: David B. Sweet, Akron, Ohio

[73] Assignee: The B. F. Goodrich Company, Akron, Ohio

[21] Appl. No.: 771,707

[22] Filed: Feb. 24, 1977

[51] Int. Cl.² ............................................. H02K 13/00
[52] U.S. Cl. ..................................... 310/239; 310/232; 310/247; 244/134 D
[58] Field of Search ............... 310/232, 239, 219, 127, 310/238, 128, 237, 147, 143, 240, 148, 242, 244–247, 249, 43; 244/134 D

[56] References Cited

U.S. PATENT DOCUMENTS

| 2,872,606 | 2/1959 | Brill | 310/232 |
| 3,066,386 | 12/1962 | Filipczak | 310/232 |
| 3,314,038 | 4/1967 | Rutten | 310/232 |
| 3,387,155 | 6/1949 | Kruls | 310/249 |
| 3,967,148 | 6/1976 | Walsh | 310/239 |

FOREIGN PATENT DOCUMENTS 698072 10/1940 Fed. Rep. of Germany ............ 310/239

Primary Examiner—R. Skudy
Attorney, Agent, or Firm—Joseph Januszkiewicz

[57] ABSTRACT

A brush assembly for use with rotating slip rings wherein a plurality of brush modules composed of flat separate elements with brushes therein are assembled in a stacking order with spacers selectively placed between modules to facilitate the positioning of the brushes opposite the slip rings. Each module is molded separately to provide ease of molding, assembling and maintenance.

16 Claims, 10 Drawing Figures

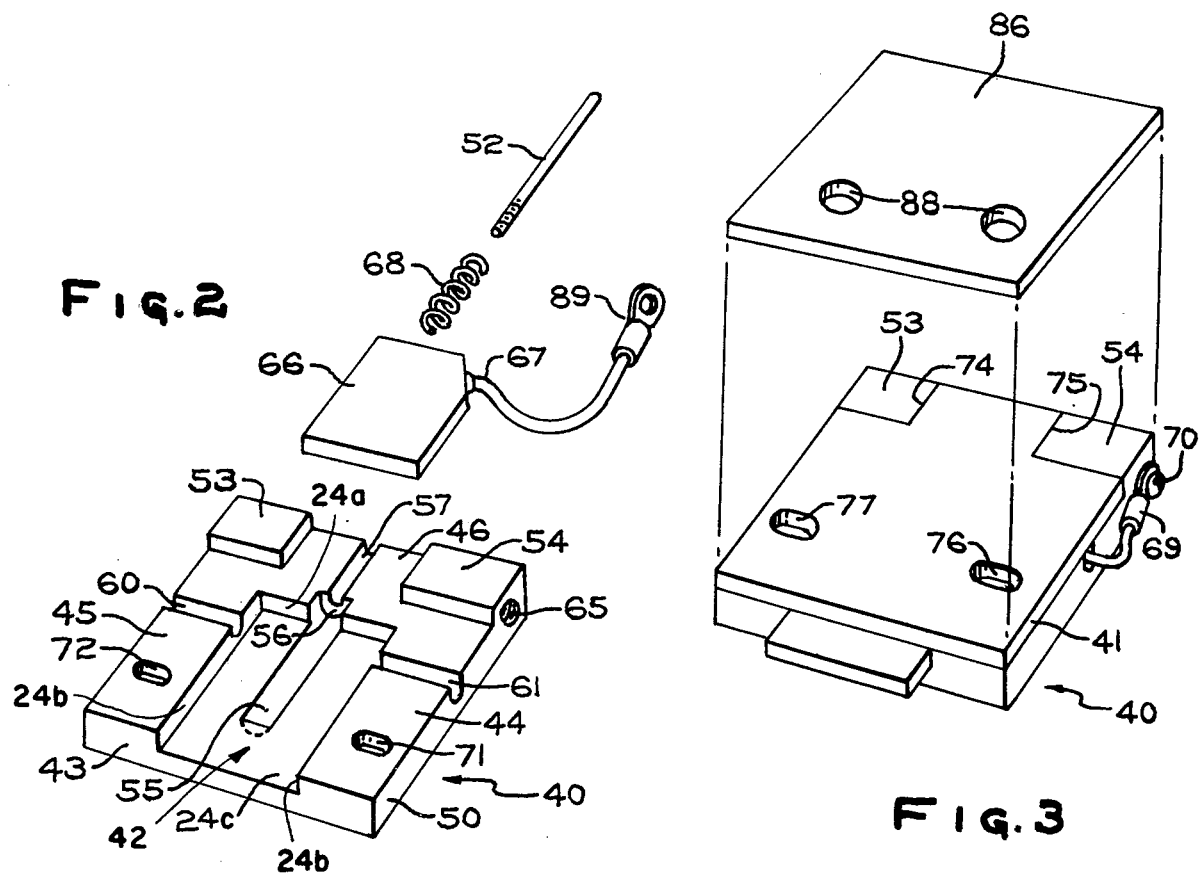
FIG. 2
FIG. 3
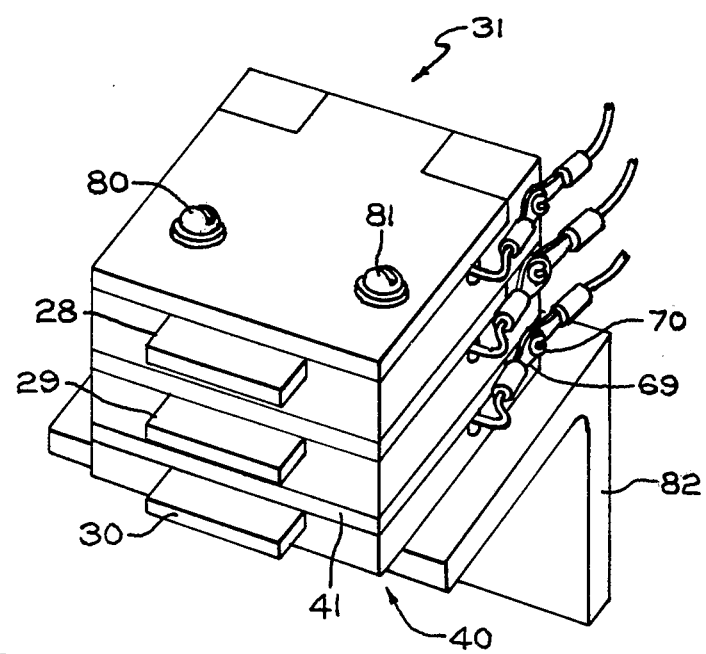
FIG. 4

AIRCRAFT BRUSH MODULE

BACKGROUND OF THE INVENTION

This invention relates to a brush module assembly wherein a plurality of modules with brushes therein are cooperative with slip rings on an aircraft to conduct electricity to deicers on propeller blades and more particularly to a brush module assembly having replacable modules wherein the brush modules are capable of being stacked to provide as many brushes as are necessary to mate with the corresponding slip rings. Heretofore, in the use of brushes with slip rings, a brush holder was molded out of plastic into a two piece unit, which pieces had intricate parts to hold the movable brushes, springs, guide rods and the electrical connections. The fabrication of the molds are extremely expensive and their use was limited to the precise slip ring for which they were made, since the clearance space varied with engine propeller and air frame construction as well as slip ring diameters and configurations. The present invention contemplates a module type of construction which was versatile in its adaptation to the number of slip ring, their location and the clearance space available between the engine, propeller, or all frame members. In addition, the modules could be spaced from each other by a spacer means to modify the spacing arrangement to facilitate its use with a slip ring arrangement whose radial distances varied. The size of the spacer means in cooperation with the modules permits greater flexibility of use, increased standardization of parts with its corresponding reduction in overall inventory and greater economy in production since the intricacy of mold and its parts is reduced significantly thereby permitting the use of less costly tooling. A further advantage of the module assembly is that it is easier to replace worn brushes in the field since the brushes do not have to be desoldered from connectors. This eliminates problems caused by cold solder joints and shorting shunt leadwires.

SUMMARY OF THE INVENTION

The present invention contemplates a brush module assembly for use in establishing an electrical connection to rotating slip rings. The brush module assembly is composed of a plurality of modules that are stacked one upon the other and interconnected mechanically to provide a plurality of outwardly projecting brushes that are biased into contact with their respective slip rings. Each brush module is molded into a pair of flat members which interlock to form a composite flat unitary block.

BRIEF DESCRIPTION OF THE DRAWINGS

FIG. 2 is an exploded perspective view of a brush module.

FIG. 3 is a perspective view of a brush module with a spacer member positioned above the module.

FIG. 4 is a perspective view of a brush assembly showing a plurality of modules interconnected to a bracket for mounting on the engine housing.

DETAILED DESCRIPTION

Figure 1:
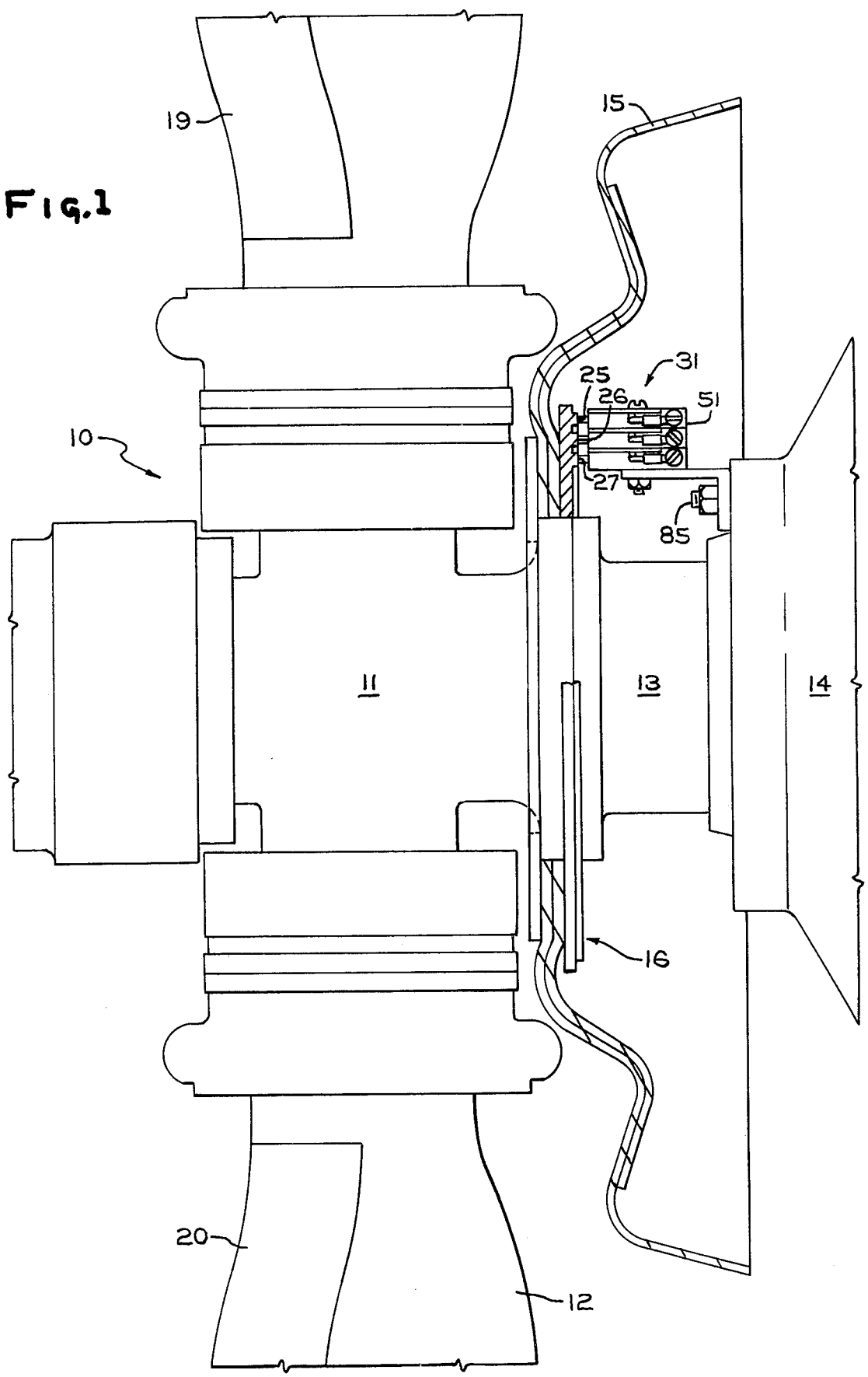
FIG. 1 is a fragmentary side elevational view, partly in section of a propeller assembly showing a deicer pad on the propeller blades with a brush module assembly contacting the rotatable slip rings.

Referring now to the drawings, wherein like reference characters designate like or corresponding parts throughout the several views, there is shown in FIG. 1 a propeller assembly designated generally as 10 having a hub 11 to which is suitably secured a plurality of propeller blades 12, each of which extends radially outwardly from an axis of rotation of the drive shaft 13. The engine for the drive shaft 13 is mounted aft of the housing 14 and suitably connected to the drive shaft in a manner old and well-known in the art. Secured to the hub 11 and shaft 13 for rotation therewith are a spinner bulkhead 15 and a slip ring assembly 16, which slip ring assembly 16 makes contact with the brushes to be described to conduct an electric current via suitable straps and conductors to deicer boots 19 and 20 which are suitably mounted on the leading edges of the propeller blades 12.

The slip ring assembly 16, which rotates with the propeller blades 12, has an outer slip ring 25, an intermediate slip ring 26 and an inner slip ring 27, which slip rings are engageable with brushes 28, 29 and 30 respectively contained in a brush block assembly designated 31. The brush block assembly 31 as shown in FIG. 4 contains three modules, although more or less modules may be mounted together depending on the number of slip rings to be used.

A brush module is composed of a base 40 that is generally rectangular shaped and a lid 41. Base 40 has a front face 43 and a rear face with a rectangular shaped guideway or recess 42 that extends centrally therein from the front face 43 defining a pair of longitudinally extending flat planar surfaces 44-45 that merge with a bridging portion 46 at the rear portion of the base. The recess 42 is base 40 defines a back wall 24a, two side walls 24b and 24c, and a bottom surface 24d. Base 40 is shown as substantially a flat square member with parallel outer side wall surfaces 50 (only one shown in FIG. 2), the front surface or face 43 and a rear outer surface 51 (FIG. 1). The general configuration may be varied. The lower surface is a flat planar surface while the two flat planar surfaces 44 and 45 and the bridging portion 46 form a flat planar surface except for a pair of abutments 53 and 54 located on the respective rear end portions of the flat planar surfaces 44-45. Base 40 has a centrally disposed groove 55 located within recess 42. Groove 55 extends rearwardly into bridging portion 46 to form a shoulder 56. A second groove or slot 57 smaller than groove 55 and in alignment therewith extends the full width of the bridging portion 46 from the shoulder to the rear surface 51. The flat planar surfaces 44-45 have grooves or passageways 60 and 61 respectively to accommodate wires to be described. Although two passageways are shown only one passageway may be provided. Threaded bores 65 extend from the side surface 50 into the side portions of base 40 to accommodate a set screw which is operative to connect conductive wire together.

A flat rectangular shaped brush 66 made of conductive material has one end of an insulated wire 67 suitably connected thereto. Brush 66 is slidably received by recess 42 in base 40, with the front portion of the brush or brush member 66 adapted to extend outwardly out of recess 42 to contact a slip ring. The base 40 and lid 44 are made of di-electric material. The other end of the insulated wire 67 is stripped of the insulation and a ring type terminal 69 is crimped thereon. The ring terminal 69 is attached to the base 40 of the module via a threaded screw 70 passing through the terminal 69 and threaded into threaded bore 65. Electrical connection means from the deicer pads 19 and 20 are made to the slip rings while suitable electrical connection means are made from the ring terminals 69 to the propeller deicer system timers and aircraft power source. A threaded insert is molded or otherwise installed into the threaded bore 65 or in lieu of bore 65. A pair of holes 71 and 72 extend through the flat planar surfaces of the base for a purpose to be described. Brush 66 when seated in recess 42 abuttingly engages a compression spring 68 which is seated in groove 55. Spring 68 has its one end positioned against shoulder 56 to bias the brush 66 outwardly from the recess 42 for engagement with the slip ring opposite it. An elongated guide rod 52 be used to position the spring 68 in the groove 55 by extending into slot 57 through coil compression spring 68 and being suitably connected to the brush 66. The flat lid 41 is a generally rectangular flat shaped member having two notches 74-75 at the rear portions thereof such that lid 41 is securely retained on base 40 by the notches 74-75 frictionally and complimentary engaging the abutments 53 and 54 to form a flat upper planar surface. Lid 41 has a pair of spaced holes 76-77 which are aligned with holes 71-72 in base 40 to facilitate their fastening together. The lid 41 may be bonded to the base 40 by a suitable adhesive being applied to flat planar surfaces 44-45 which facilitates assembly of the module which thereby retains the brushes and springs in the module.

FIG. 3 discloses a single module with a base 40 and lid positioned thereon with a spacer 86 positioned thereabove, while FIG. 4 discloses three modules stacked together without spacers 86 and interconnected by a pair of bolts 80-81 which attach such modules to an angle bracket 82. One angle portion of bracket 82 has a plurality of bores to permit its attachment to the outer forward periphery of housing 14 as by bolts 85.

Figure 5:
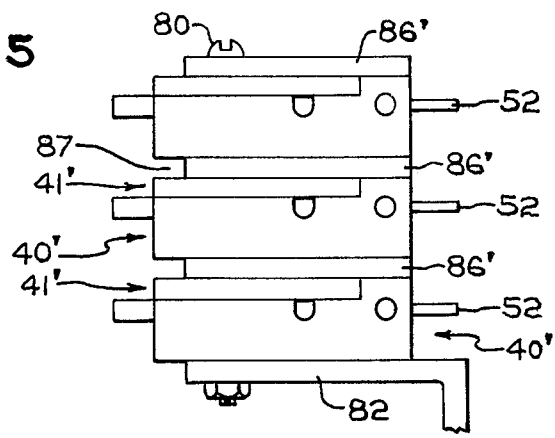
FIG. 5 is a side elevational view of a brush module assembly.
Figure 6:
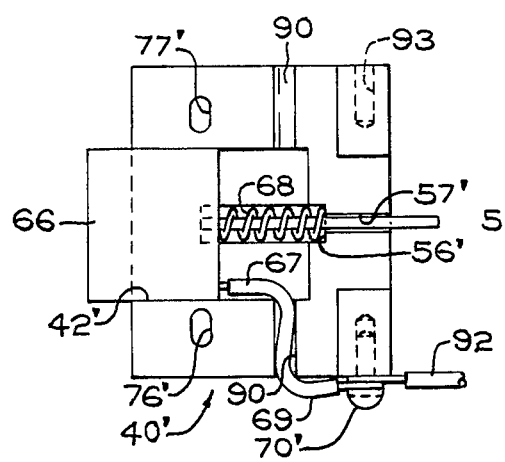
FIG. 6 is a plan view of the base member of a brush module showing the brush in full.

A modification of the module assembly is shown in FIGS. 5 and 6 wherein like reference characters designate like parts as in the original described embodiment. The brush module consisting of a base 40', and lid 41' are separated from an adjacent module by a spacer 86', which spacer 86' is smaller in length than the adjacent lid 41' and base 40' to provide a clearance space 87 therebetween. The clearance space increases the path length between brushes and prevents building up to avoid a short circuit. The spacer 86' are rectangular or square shaped whose thickness may be varied to adjust the distance between adjacent brushes to facilitate the positioning of the brushes 66 accurately relative to the slip ring 25, 26 and 27. Spacer 86' has a pair of spaced holes 88 as in the embodiment shown in FIG. 3 in alignment with the holes 77' and 76' of the lid to facilitate their interconnection to form a brush assembly. The spacers 86' as well as the base 40' and lid 41' are made of dielectric material.

The recess 42' in base 40' of the modified form shown in FIG. 6 has a curved wall portion 90 and 91 to accomodate the movement of the wire 67 as brush 66 moves in such recess to prevent kinking of the wire. Guide rod 52 is shown as encompassed by spring 68 and attached to the brush 66. The terminal 69 is shown as connected by screw 70' to an electrical line 92. A threaded bore 93 is shown on the other side portion of the brush module to facilitate the assembling of the brush modules. Such bore 93 may be eliminated as described hereinafter. The separate modules are interconnected onto bracket 82 by screws or suitable bolts 80 as in the first described embodiment.

In the assembling of the modules, the brushes 66 with their respective spring 66 and guide rods 52 are positioned within the recess 42 with the compression spring resting on shoulder 56' and the guide rod 52 projecting out of slot 57'. The respective lids 41' are then positioned on the base 40' thereby making a module which is flat and easy to stack for assembling onto the bracket. Where desired, the separate modules have a spacer 86' positioned therebetween to facilitate locating the brushes 66 opposite their respective slip rings as shown in FIG. 1. As the brush 66 wears due to its frictional contact with the slip rings, the compression spring 68 biases the brush 66 into contact with the slip rings, moving the end portion of the rod 52 into slot 57' until it disappears from external view, which indicates the need to replace the modules and its brush.

Figure 7:
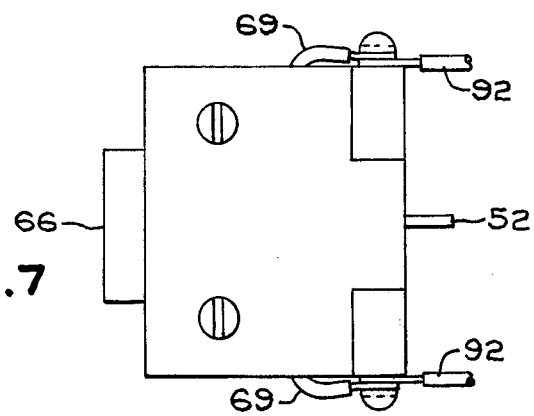
FIG. 7 is a plan view of a couple of brush modules stacked with the electrical connections of the brush module on opposite sides of the module assembly.

In the examples discussed, the brush modules are symmetrical in configuration and in stacking such brush modules they may be flipped 180° to facilitate the positioning of the electrical connections such as elements 69 and 92 (FIG. 7) to be on opposite sides of the block as shown in FIG. 7. This is particularly useful as where three brush modules are stacked so that the lower and upper brush modules are positioned as in FIG. 7 to have the electrical line 92 on one side of the assembly and the middle or intermediate brush module so positioned that its electrical connection is on other side of the assembly. This type of assembling permits the elimination of the one groove 60 in FIG. 2 or the curved wall portion 91 in FIG. 6 along with the threaded bore 93.

Figure 8:
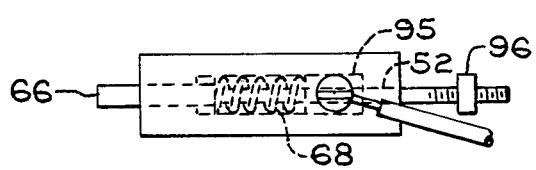
FIG. 8 is a side elevational view of a modified form of brush module.
Figure 9:
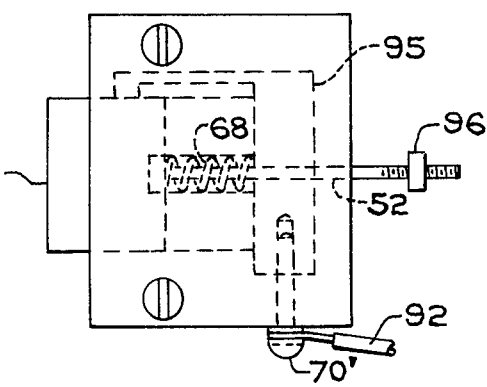
FIG. 9 is a plan view of the modified form of brush module shown in FIG. 8.

Another modification is shown in FIGS. 8 and 9 which is substantially the same as that described above except that the brush module is shown as a one piece molded unit having electrically conductive insert 95 molded therein. Thus, the brush 66 with its guide rod 52 via insert 95 provides a conductive path to the threaded bolt 70' and to conductor 92. A retaining ring or stop means 96 may be mounted on one end of the guide rod 52 to limit the outward movement of the brush 66. The conductive insert 95 could have an extension along one side of the brush 66 to maintain a conductive path therebetween.

Figure 10:
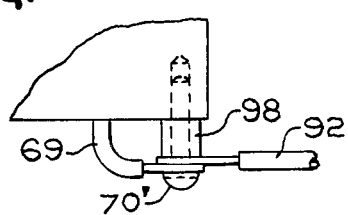
FIG. 10 is a fragmentary view of a portion of a brush module showing a modified form of spacer for the electrical connection.

A variation on the means for attaching the conductive or electrical line 92 to the module is shown in FIG. 10 wherein a spacer 98 of dielectric material is positioned between the module and the head of the screw or bolt 70' thus permitting the stacking of three modules into one assembly with the bottom and top module having a module as described and shown in either FIGS. 2, 6 or 7 and the intermediate module as that shown and described in FIG. 10. This insures ease of installation, and maintenance of the brush modules.

It will be apparent that, although a specific embodiment and certain modifications of the inventions have been described in detail, the invention is not limited to the specifically illustrated and described constructions since variations may be made without departing from the principles of the invention.

I claim:

1. A brush assembly for establishing electrical connection from a brush assembly to a rotating slip ring comprising a pair of flat members made of dielectric material; one of said members having a recess to provide an opening therein; a brush slidably mounted in said recess; spring means located in said recess for biasing said brush outwardly out of recess to project a portion of said brush through said opening; a passageway in said one member extending into said one member for communicating with said recess; a wire secured to said brush member and extending through said passageway outwardly of said brush assembly; means interconnecting said flat members to retain said members in abutting relationship; said one flat member has a forward portion and a rear portion; said recess being located in said forward portion and extending into said rear portion; a slot in said rear portion communicating with said recess; said brush having a rod secured thereto for linear movement therewith; and said rod guided by said slot for projection out of said one flat member indicating the wear of said brush.

2. A brush assembly for establishing electrical connection from a brush to a rotating slip ring comprising; a flat base member, said base member having a front portion and a rear portion; a central recess in said base member extending outwardly through said front portion; said base member having a pair of abutments on said rear portion; a flat lid located on said base member; said lid having a pair of notches on the one end portion; said notches forming shoulders for abuttingly contacting said abutments on said base member; said lid having an upper surface that is flush with the upper surface of said abutments to present a flat coplanar surface therewith; said lid cooperative with said base to form with said recess an opening into said base; a groove in said base located in said recess and terminating at said rear portion to form a shoulder; said lid and said base member made of dielectric material; an electrical brush member having a wire extending outward therefrom slidably received by said recess with a portion of said brush extending outwardly through said opening; a compression spring positioned in said groove having one end abutting said shoulder of said groove and the other end abutting said brush member for biasing a portion of said brush member out of said recess; a passageway in said base extending through said front portion for communications with said recess; and said wire extending through said passageway for connection to a source of power.

3. A brush assembly for establishing electrical connection from a brush to a rotating slip ring comprising, a flat base member, said base member having a front portion and a rear portion, a central recess in said base member extending outwardly through said front portion, said base member having a pair of abutments on said rear portion, a flat lid located on said base member, said lid having a pair of notches on the one end portion, said notches forming shoulders for abuttingly contacting said abutments on said base member, said lid having an upper surface that is flush with the upper surface of said abutments, said lid cooperative with said base to form with said recess an opening into said base, a groove in said base located in said recess and terminating at said rear portion to form a shoulder, said lid and said base member made of dielectric material, an electrical brush member having a wire extending outward therefrom slidably received by said recess with a portion of said brush extending outwardly through said opening, a compression spring positioned in said groove having one end abutting said shoulder and the other end abutting said brush member for biasing a portion of said brush member out of said recess, a passageway in said base extending through said front portion for communications with said recess; said wire extending through said passageway; said base member having a slot therein communicating with said groove, and a rod member connected to said brush member and projecting out of said slot.

4. A brush assembly as set forth in claim 3 wherein the juncture of said passageway with said recess is a curved wall to prevent kinking of the wire.

5. A brush assembly for holding a plurality of electrical brushes for contacting movable electrical contacts comprising: a plurality of modules; each module having a flat upper and a flat lower exterior surface to permit stacking of said modules; each of said modules made of dielectric materials; means interconnecting said modules with said surfaces in parallel relationship and said modules in stacked, abutting relationship; each of said modules having a flat base member and a flat lid member; the surfaces of said base members and said lid members are parallel; each base member has a recess therein; each of said base members having a brush member located in each of said recesses; biasing means in each of said recesses biasing said brush members outwardly to project a portion of said brush out of said recess toward the movable electrical contacts; passageway means in each of said modules; an electrical conducting wire connected to each of said brush members and extending through said passageway means for conducting electricity therethrough.

6. A brush assembly as set forth in claim 5 wherein each of said lid members is notched at their respective rear side end portions; and each of said base members has an abutment at their respective rear side end portions to complementary engage adjacent notches in said lid members to form a module to define said flat upper and said lower flat surfaces to facilitate stacking into a unitary whole.

7. A brush assembly as set forth in claim 6 wherein a flat spacer is located between each pair of adjacent modules.

8. A brush assembly as set forth in claim 7 wherein each of said modules has a front face and a rear face, each of said spacer has a front face and a rear face, and said front faces of said modules project forwardly of said faces of said spacers to define a recess between adjacent modules.

9. A brush assembly as set forth in claim 6 wherein said recess in each of said base members defines a pair of spaced side portions and a rear bridging portion; the upper surfaces of said side portions and said rear bridging portion form a flat first planar surface, the upper surface of said abutments forming a second planar surface parallel to said first planar surface but spaced therefrom, each of said modules having the lower surface of said lid complimentary to and abuttingly engaging the respective said first planar surface of said base member therein, and each of said modules having the upper surface of said lid lying in said second planar surface of said abutment.

10. A brush assembly as set forth in claim 9 wherein each of said base members has a threaded bore on one side edge thereof for receiving a set screw for connecting the end portion of said conducting wire to an electrical input line for directing an electrical current to said brushes.

11. A brush assembly as set forth in claim 10 wherein a spacer is inserted on certain ones of said set screws to project the heads of said set screws outwardly away from said one side edge to stagger the outer ends of said set screws.

12. A brush assembly for holding a plurality of brushes for establishing electrical connection from the brushes to a plurality of rotating slip rings comprising; a plurality of dielectric modules; each module having a base member and a lid member; each of said base members having a recess therein defining a pair of side portions with upper surfaces and a rear bridging portion with an upper surface; said upper surfaces of said side portions and said upper surface of said bridging portion of each base member being parallel and lying in a planar surface; each of said modules having planar top and bottom surfaces to facilitate stacking together; means interconnecting said modules into a compact unitary whole with their adjacent said planar surfaces abuttingly contacting each other; each of said base members having a pair of spaced abutments on said rear bridging portion; a lid located on each of said base members to form a single module; each of said lids having a pair of spaced notches; said lids and said bases of each module having their respective said notches abuttingly contacting said abutments on said base member; said lids and said base members of each module cooperative together to form with said recess an opening into said base member; an electrical brush member having a wire extending outward therefrom slidably received by said recess with a portion of said brush extending outwardly through said opening; a compression spring positioned in said recess biasing said brush outwardly therefrom; a passageway in said base member extending through one of said side portions for communications with said recess, said wire extending through said passageway for connection to an electrical input means, and each of said modules.

13. A brush assembly as set forth in claim 12 wherein said base has a slot in said rear bridging portion, and an elongated rod connected to said brush member and extending through said slot for movement with said brush member.

14. A brush assembly for establishing electrical connection from a brush assembly to a rotating slip ring comprising at least a pair of modules made of dielectric material; each module being a rectangular shaped hexahedron with a front face and flat upper and lower surfaces; each module having a recess therein extending through said front face; adjacent ones of said modules being stacked to have their respective adjacent upper and lower surfaces abuttingly contacting each other; each module has an electrically conductive stationary insert in said recess surrounded by said dielectric material except for that portion facing said front face of said module; each insert having a narrow bore extending therethrough; a brush slidably mounted in each of said recesses; spring means located in each of said recesses for biasing said brushes outwardly out of recesses to project a portion of said brush through their respective said opening; an elongated conductive rod slidably received by each of said narrow bores for abutting electrical contacting said adjacent insert; one end of each of said rods being connected to one of said brushes and the other end of said rod projects out of said module; a threaded bore in each of said modules extending into said conductive insert; a threaded bolt extending into said bore for threaded engagement with said insert maintaining electrical conductive contact with said insert; and means interconnecting said modules to retain said modules in said stacked relationship.

15. A brush assembly as set forth in claim 14 wherein each of said other ends of said rods have a stop means thereon to limit the linear outward movement of the brushes out of their respective said recesses.

16. A brush assembly for establishing electrical connection from a brush assembly to a rotating slip ring comprising a pair of flat members made of dielectric material; one of said flat members having a recess to provide an opening therein; said recess provides a back wall, two side walls, and a bottom surface in said one member; a brush slidably received by said recess for contact with said side walls and said bottom surface; spring means located in said recess for contact with said back wall and said brush for biasing said brush outwardly out of recess to project a portion of said brush through said opening; a passageway in said one member extending into said one member for communicating with said recess; a wire secured to said brush member and extending through said passageway outwardly of said brush assembly; means interconnecting said flat members to retain said members in flat abutting relationship; said means interconnecting said flat member include a pair of spaced notches on the other of said members; and said interconnecting means includes a pair of abutments on said one member which abutments are received by said notches.

* * * * *